(12) United States Patent
Sarabia et al.

(10) Patent No.: US 10,756,924 B2
(45) Date of Patent: Aug. 25, 2020

(54) SYSTEM AND METHOD FOR ENCODING DATA WITHIN A VEHICLE COMMUNICATION NETWORK

(71) Applicant: Denso International America, Inc., Southfield, MI (US)

(72) Inventors: Rene Sarabia, Dublin, CA (US); Akihito Iwai, San Jose, CA (US)

(73) Assignee: DENSO International America, Inc., Southfield, MI (US)

(*) Notice: Subject to any disclaimer, the term of this patent is extended or adjusted under 35 U.S.C. 154(b) by 289 days.

(21) Appl. No.: 15/485,263

(22) Filed: Apr. 12, 2017

(65) Prior Publication Data
US 2018/0302237 A1 Oct. 18, 2018

(51) Int. Cl.
*G06F 15/16* (2006.01)
*H04L 12/40* (2006.01)
(Continued)

(52) U.S. Cl.
CPC .......... *H04L 12/40* (2013.01); *H04L 63/08* (2013.01); *H04W 4/44* (2018.02); *H04W 12/0806* (2019.01); *H04L 2012/40273* (2013.01)

(58) Field of Classification Search
CPC .......... H04L 12/40; H04L 63/08; H04W 4/44; H04W 12/08; H04W 4/48; H04W 4/46;
(Continued)

(56) References Cited

U.S. PATENT DOCUMENTS 8,176,327 B2 * 5/2012 Xiong ............... G06F 21/445
713/176
8,665,891 B2 3/2014 Katou et al.
(Continued)

FOREIGN PATENT DOCUMENTS

WO 20110160348 A1 12/2011
WO 2012092864 A1 7/2012
(Continued)

OTHER PUBLICATIONS

"An Interface Theory for the Internet of Things," M. Lohstroh, Springer, LNCS 9276 (eds.), Software Engineering and Formal Methods (SEFM), Sep. 2015, 15 pgs.
(Continued)

*Primary Examiner* — Kaylee J Huang
(74) *Attorney, Agent, or Firm* — Harness, Dickey & Pierce, P.L.C.

(57) ABSTRACT

A vehicle communication system that provides data between various objects (i.e., devices) within a vehicle communication network is disclosed. In one or more implementations, the vehicle communication system includes an accessor interface module that receives data encoded in an automotive connectivity communication protocol from another accessor module. The other accessor module is associated with an originating object within a vehicle communication network. The data encoded in the automotive connectivity communication protocol includes an object data portion defining a domain associated with a destination object and a payload data portion. The domain has a corresponding authentication protocol for authenticating the data. The accessor interface module authenticates the data according to the authentication protocol. The vehicle communication system also includes an object-specific protocol encoder module that determines an object-specific communication protocol associated with the destination object. The object- (Continued)

specific communication protocol encodes the payload data portion according to the object-specific communication protocol.

14 Claims, 5 Drawing Sheets

(51) Int. Cl.
   *H04W 4/44* (2018.01)
   *H04L 29/06* (2006.01)
   *H04W 12/08* (2009.01)

(58) Field of Classification Search
   CPC .............. B60R 16/023; B60R 16/0231; B06R 16/0231
   USPC .................................. 709/217, 218, 230, 206
   See application file for complete search history.

(56) References Cited

U.S. PATENT DOCUMENTS

| | | | | |
|---|---|---|---|---|
| 8,705,527 | B1* | 4/2014 | Addepalli | H04W 4/046 370/389 |
| 2002/0184527 | A1* | 12/2002 | Chun | H04L 63/02 726/4 |
| 2003/0009271 | A1 | 1/2003 | Akiyama | |
| 2012/0213205 | A1 | 8/2012 | Tammisetti | |
| 2013/0031212 | A1* | 1/2013 | Enosaki | H04L 12/40 709/218 |
| 2013/0159466 | A1 | 6/2013 | Mao | |
| 2013/0201316 | A1 | 8/2013 | Binder et al. | |
| 2013/0235402 | A1* | 9/2013 | Yamamichi | G06F 3/1204 358/1.13 |
| 2014/0163774 | A1* | 6/2014 | Demeniuk | H04L 67/12 701/2 |
| 2014/0244768 | A1 | 8/2014 | Shuman et al. | |
| 2014/0244825 | A1 | 8/2014 | Cao et al. | |
| 2014/0289797 | A1* | 9/2014 | Trani | H04L 63/08 726/3 |
| 2015/0006719 | A1 | 1/2015 | Gupta et al. | |
| 2015/0071052 | A1 | 3/2015 | Hershberg et al. | |
| 2015/0071216 | A1 | 3/2015 | Ilsar et al. | |
| 2015/0081904 | A1 | 3/2015 | Guedalia et al. | |
| 2015/0130957 | A1 | 5/2015 | Berelejis et al. | |
| 2015/0134761 | A1 | 5/2015 | Sharma et al. | |
| 2015/0156266 | A1 | 6/2015 | Gupta | |
| 2015/0172298 | A1* | 6/2015 | Otsuka | H04L 63/123 726/30 |
| 2015/0199610 | A1 | 7/2015 | Hershberg | |
| 2015/0215280 | A1 | 7/2015 | Chang et al. | |
| 2015/0249642 | A1 | 9/2015 | Burns et al. | |
| 2015/0256385 | A1 | 9/2015 | Chandhok et al. | |
| 2015/0271019 | A1* | 9/2015 | Reich | H04L 41/0816 709/221 |
| 2015/0288622 | A1 | 10/2015 | Fargano et al. | |
| 2015/0295763 | A1 | 10/2015 | Yu et al. | |
| 2015/0339917 | A1 | 11/2015 | Messing et al. | |
| 2015/0341446 | A1 | 11/2015 | Nguyen et al. | |
| 2015/0349975 | A1 | 12/2015 | Hu et al. | |
| 2015/0373481 | A1 | 12/2015 | Eom et al. | |
| 2016/0214551 | A1* | 7/2016 | Armacost | B60D 1/36 |
| 2017/0063927 | A1* | 3/2017 | Schultz | H04L 63/20 |
| 2017/0207966 | A1* | 7/2017 | Ganslmeier | H04L 41/0816 |
| 2017/0240125 | A1* | 8/2017 | Weigert | B60Q 1/34 |

FOREIGN PATENT DOCUMENTS

| | | |
|---|---|---|
| WO | 20130023429 A1 | 2/2013 |
| WO | 2013040844 A1 | 3/2013 |
| WO | 2013127191 A1 | 9/2013 |

OTHER PUBLICATIONS

"Cisco Explains the Internet of Cars; The next revolution in personal transportation," Telematics Wire, published Jan. 17, 2015, 4 pgs.

* cited by examiner

SYSTEM AND METHOD FOR ENCODING DATA WITHIN A VEHICLE COMMUNICATION NETWORK

FIELD

The present disclosure relates to a system that provides a vehicle communication network allowing devices to communicate with one another, and more specifically to a system and a method for transmitting data encoded in an automotive connectivity communication protocol between respective accessor modules within the vehicle communication network.

BACKGROUND

This section provides background information related to the present disclosure and is not necessarily prior art.

Automotive vehicles employ electronic control modules to control various aspects and/or devices within the automotive vehicle. In some instances, the automotive vehicles employ multiple communication systems and/or networks to allow communication between the various electronic control modules and/or devices. For instance, automotive vehicles can employ communication buses, such as a Controller Area Network (CAN) Bus, a Local Interconnect Network (LIN) Bus, and the like. Additionally, automotive vehicles can also employ communication systems and/or networks to allow communication between the automotive vehicle devices and the Internet of Things (IoT) technologies.

SUMMARY

This section provides a general summary of the disclosure, and is not a comprehensive disclosure of its full scope or all of its features.

A vehicle communication system that provides data between various objects (i.e., devices) within a vehicle communication network is disclosed. In one or more implementations, the vehicle communication system includes an accessor interface module that receives data encoded in an automotive connectivity communication protocol from another accessor module. The other accessor module is associated with an originating object within a vehicle communication network. The data encoded in the automotive connectivity communication protocol includes an object data portion defining a domain associated with a destination object and a payload data portion. The domain has a corresponding authentication protocol for authenticating the data. The accessor interface module authenticates the data according to the authentication protocol. The vehicle communication system also includes an object-specific protocol encoder module that determines an object-specific communication protocol associated with the destination object. The object-specific communication protocol encodes the payload data portion according to the object-specific communication protocol.

A method for providing data between various objects within a vehicle communication network is disclosed. In one or more implementations, the method includes receiving data encoded in an automotive connectivity communication protocol from an accessor module associated with an originating object within a vehicle communication network. The data encoded in the automotive connectivity communication protocol includes an object data portion defining a domain associated with a destination object and a payload data portion. The domain has a corresponding authentication protocol for authenticating the data. The method also includes authenticating the data according to the authentication protocol and determining an object-specific communication protocol associated with the destination object. The method also includes encoding the payload data portion according to the object-specific communication protocol.

A vehicle communication system that provides data between various objects within a vehicle communication network is disclosed. The vehicle communication system includes an originating object communicatively connected to a vehicle communication network. The originating object including an accessor module that includes an accessor interface module that receives data encoded in a first communication protocol associated with the originating object. The accessor also includes an automotive connectivity protocol encoder module that encodes data according to an automotive connectivity communication protocol. The data encoded in the automotive connectivity communication protocol includes an object data portion defining a domain associated with a destination object and a payload data portion. The domain has a corresponding authentication protocol for authenticating the data. The vehicle communication system also includes the destination object that is communicatively connected to the vehicle communication network. The destination object includes an accessor module. The accessor module of the destination object includes an accessor interface module that receives the data encoded in the automotive connectivity communication protocol from the accessor module of the originating object, and the accessor interface module authenticates the data according to the authentication protocol. The accessor module also includes an object-specific protocol encoder module that determines an object-specific communication protocol associated with the destination object and encodes the payload data portion according to the object-specific communication protocol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Modern automotive vehicles typically employ multiple electronic control modules (ECMs). The electronic control modules control various aspects of the automotive vehicle as well as transmit information between the respective electronic control modules. Additionally, as the Internet of Things continues to proliferate, consumers may continue to want the various Internet of Things devices to connect with the automotive vehicle. However, each of these devices may employ a different communication protocol.

Thus, the present disclosure is directed to a system to provide inter-communication operability between the various Internet of Things devices. More specifically, respective devices (i.e., vehicle devices, Internet of Things devices, etc.) may employ an accessor module. In one example, the accessor module receives data encoded according to a transmitting (i.e., originating) device communication protocol (i.e., communication protocol specific to the transmitting device). The accessor module then encodes the data according to an automotive connectivity communication protocol that is homogenous between accessor modules. The accessor module can then transmit the data encoded in the automotive connectivity communication protocol to an accessor module of a destination device. The accessor module of the destination device decodes the data and can then encode the data according to the destination device communication protocol. In various implementations, the accessor module can validate the data and/or the device according to the automotive connectivity communication protocol.

Figure 1:
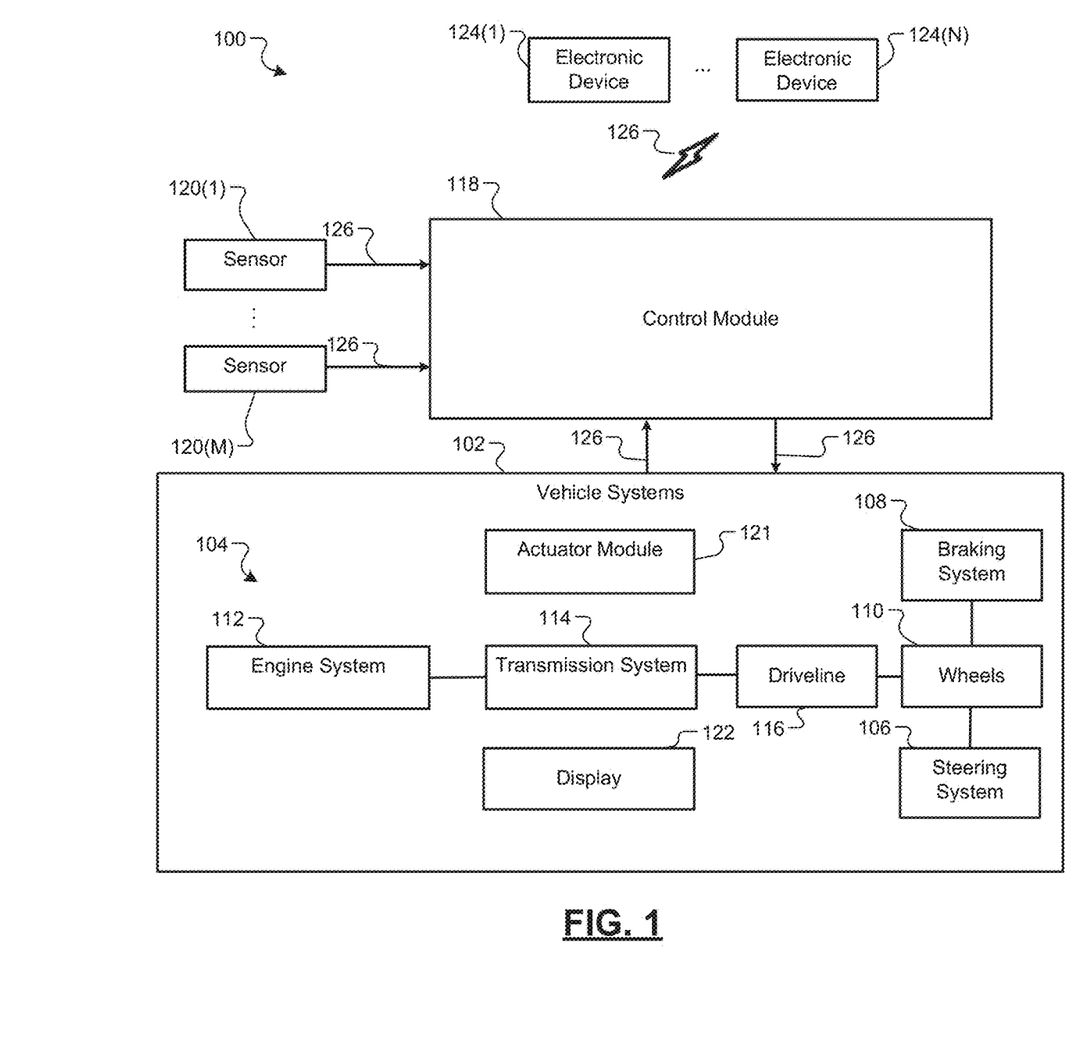
FIG. 1 illustrates a vehicle communication environment in accordance with an example implementation of the present disclosure.

FIG. 1 illustrates an example vehicle communication environment 100 in accordance with an example implementation of the present disclosure. As shown, the example vehicle communication environment 100 includes a vehicle 102 that includes a powertrain system 104, a steering system 106, and a braking system 108. The powertrain system 104 is a system of components that drive one or more wheels 110 of the vehicle 102, referred to herein as driven wheels. The powertrain system 104 includes an engine system 112, a transmission system 114, and a driveline 116. The present disclosure is not limited to conventional powertrains or hybrid powertrains. The present disclosure is also not limited to powertrains of a particular layout or drivelines of a particular type. For example, the transmission system 114 may include an automatic transmission, a manual transmission, or a continuously variable drive ratio transmission (CVT).

The example vehicle communication environment 100 also includes a control module 118 that controls one or more aspects of the vehicle 102. For instance, the control module 118 makes control decisions for the powertrain system 104. In an implementation, the control module 118 can communicate with a transmission control module to coordinate shifting gears in a transmission. For example, the control module 118 may reduce engine torque during a gear shift. The control module 118 may communicate with a hybrid control module to coordinate operation of the engine and an electric motor.

The vehicle 102 can include one or more sensors 120(1) to 120(M) (where M is an integer greater than zero). The control module 118 receives sensor signals from the sensors 120(1) to 120(M) deployed throughout the vehicle 102. The control module 118 can utilize the sensor signals to make control decisions for the powertrain system 104. For instance, the sensors 120 measure (i.e., collect) data pertaining to the vehicle 102 and can provide the measured data as described herein. In various implementations, the sensors 120 include object detection sensors for detecting objects proximate to a vehicle. In this example, the sensors 120 include cameras (i.e., front-side cameras, back-side cameras, etc.), light detection and ranging (LiDAR) devices, radio detection and ranging (RADAR) devices, and the like. The sensors 120 may also include receivers for receiving signals encoded with elevation and time data transmitted and received according to advanced driver assistance systems (ADASIS) communication protocols.

The sensors 120 may also measure various vehicle operational parameters associated with the vehicle. For instance, the sensors 120 may measure speed, acceleration, distance traveled, powertrain characteristics, vehicle control, instrumentation characteristics, and the like. Thus, the sensors 120 can measure and provide data based upon the one or more vehicle operational parameters. In one example, the sensors 120 provide a communication pathway between various devices and vehicles. For instance, the sensors 120 receive signals transmitted within a vehicle-to-vehicle communication system (i.e., global navigation satellite system (GNSS) receivers, dedicated short range communications (DSRC) radios, etc.). The sensors 120 can also transmit signals within the vehicle-to-vehicle communication system.

The vehicle 102 also employs one or more actuator modules 121. The actuator modules 121 are controlled by engine control modules to selectively actuate a corresponding component of the vehicle 102. For instance, the vehicle 102 can employ torque actuators, valve actuators, accelerator pedal actuators, brake pedal actuators, and the like. For instance, the control module(s) 118 can cause a respective actuator module 121 to control an aspect of the vehicle 102 based upon signals received from the sensors 120.

The example vehicle communication environment 100 can also include a display 122 that can display images, video, overlays, data, and the like, based upon signals received from the control module 118. In various implementations, the display 122 can furnish information to an operator regarding an operational parameter and/or a safety parameter associated with the vehicle 102. For instance, the control module can generate an on-board diagnostic (OBD) alert, such as an OBD II alert that, that can be displayed at the display 122 to indicate detection of a safety characteristic detected by the one or more sensors 120(1) to 120(M) to the on-board diagnostic system of the vehicle 102. In implementations, the control module 118 can also generate a digital trouble code (i.e., DTC) indicative of the detected safety characteristic.

The example vehicle communication environment 100 also includes one or more electronic devices 124(1) to 124(N) (where N is an integer greater than zero). The electronic devices 124(1) to 124(N) can establish a communication with one or more vehicle devices (i.e., sensors 120(1) to 120(M), etc.) of the vehicle 102. Additionally, the one or more vehicle devices can also establish a communication with one or more other vehicle devices. By establishing a communication network 126 between the respective devices, the vehicle devices and/or the electronic devices 124(1) to 124(N) can collect and/or exchange data through a vehicle communication network 126. The electronic devices 124(1) to 124(N) can represent any number of electronic devices capable of communicating with the vehicle 102. For instance, the electronic devices 124 include servers (i.e., servers providing cloud computing services, etc.), personal computing devices (i.e., smartphones, laptops, tablets, etc.), traffic control computing devices (i.e., traffic lights, etc.), and the like.

The vehicle communication network 126 may assume a wide variety of configurations. For example, the vehicle communication network 126 may comprise any of a plurality of communications standards, protocols and technologies, including, but not limited to: automotive network communication protocols, (i.e., FlexRay, Controller Area Network (CAN) bus, Local Interconnect Network, advanced driver assistance systems, etc.) a 3G communications network, a 4G communications network, a 6LoWPAN communications network, a Scalable service-Oriented MiddlewarE over IP (SOME/IP) communication network, a Global System for Mobile Communications (GSM) environment, an Enhanced Data GSM Environment (EDGE) network, a high-speed downlink packet access (HSDPA) network, a wideband code division multiple access (W-CDMA) network, a code division multiple access (CDMA) network, a time division multiple access (TDMA) network, Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)) environment, an instant messaging (e.g., extensible messaging and presence protocol (XMPP) environment, Session Initiation Protocol for Instant Messaging and Presence Leveraging Extensions (SIMPLE), and/or Instant Messaging and Presence Service (IMPS), and/or Short Message Service (SMS)), or any other suitable communication protocol, that facilitates communication between the various devices (i.e., sensors 120, electronic devices 124, etc.) within the vehicle communication environment.

While FIG. 1 illustrates that the vehicle 102 includes a single control module 118, it is understood that the vehicle 102 can employ multiple control modules. The control module 118 may be an engine control module that controls one or more aspects of the vehicle 102. For instance, various components, systems, and sub-systems within the vehicle 102 can employ one or more control modules to control the respective component, system, or sub-system. For instance, the control module may be a powertrain control module, a transmission control module, a brake control module, a central timing module, a telematic control module, and the like. As described herein, the respective sensors 120, actuators 121, and electronic devices 124 can be referred to as objects. For instance, as described in greater detail below, data packets transmitted by a respective sensor 120, actuator module 121, and/or electronic device 124 include information identifying the destination (i.e., receiving) object (i.e., sensor 120, actuator 121, and/or electronic device 124) and/or transmitting (i.e., originating) object (i.e., sensor 120, actuator 121, and/or electronic device 124).

Figure 2:
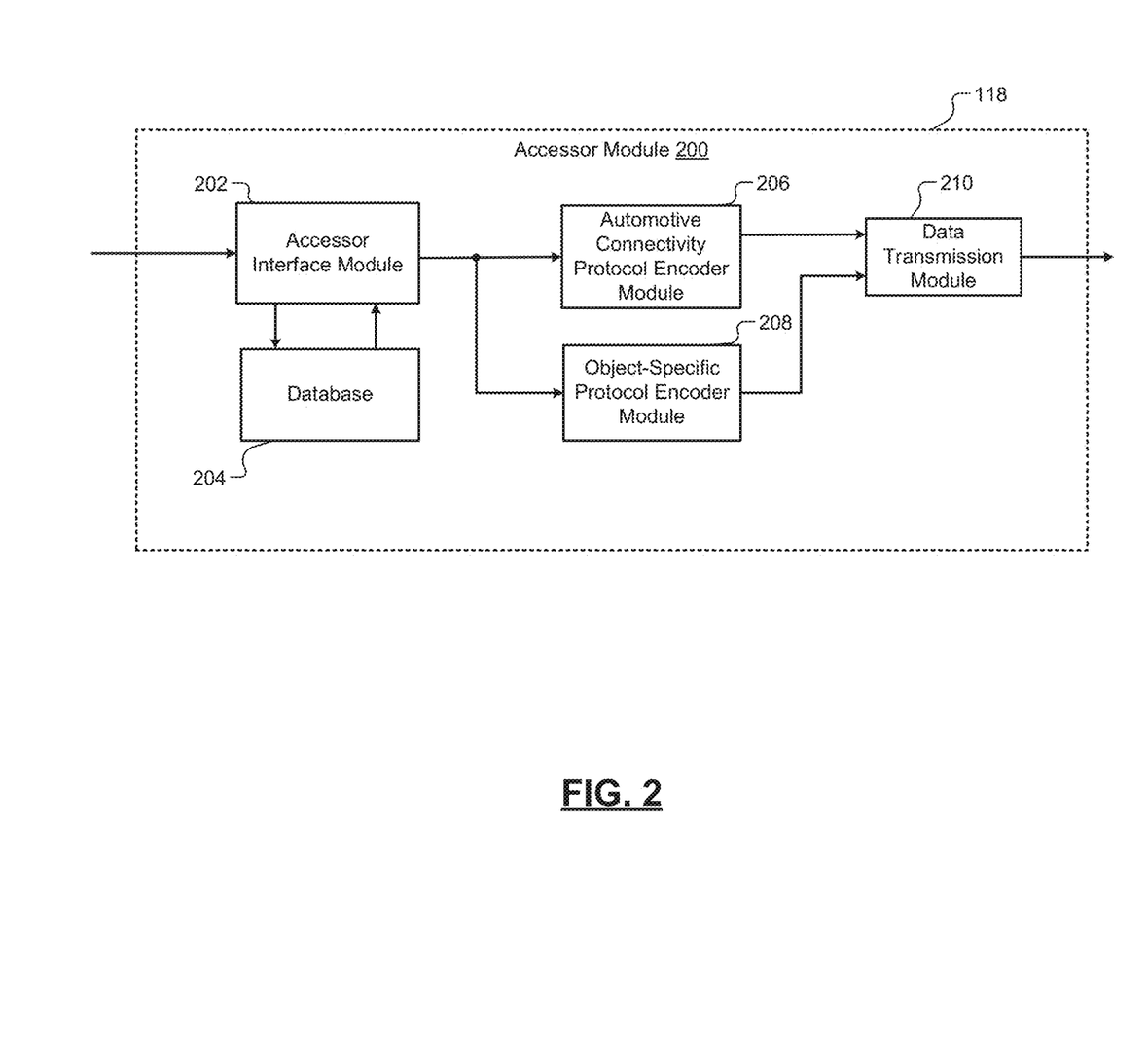
FIG. 2 illustrates a block diagram of a control module in accordance with an example implementation of the present disclosure.

Referring generally to FIG. 2, the control module 118 includes an accessor module 200. The accessor module 200 can represent a communication layer that allows applications and/or components to interact across disparate hardware and/or network environments. For instance, the accessor module 200 abstracts the underlying data transmitted within the vehicle communication network 126 to expose services that can be utilized by the respective objects. In an implementation, respective objects can initially transmit data encoded according to a device-specific communication protocol. The accessor module 200 receives the data and encodes the data into a communication protocol that can be transmitted and received between respective accessor modules 200. In one example, the accessor module 200 resides and is instantiated within the control module 118 of the respective devices.

The accessor module 200 includes an accessor interface module 202, a database 204, an automotive connectivity protocol encoder module 206, an object-specific protocol encoder module 208, and a data transmission module 210. The control module 118 uses the accessor module 200 to communicate with other control modules, which include a respective accessor module 200, within the vehicle communication environment 100. In one or more implementations, as described herein, the automotive connectivity protocol encoder module 206 encodes data according to the automotive connectivity communication protocol, and the object-specific protocol encoder module 208 encodes data according to an object-specific communication protocol.

Referring to FIG. 2, the accessor interface module 202 receives data from one or more devices (i.e., objects) connected to the control module 118 within the vehicle communication network 126. The data is encoded using a device-specific (i.e., object-specific) communication protocol. Upon, receiving the data, the accessor interface module 202 communicates with the database 204. For instance, the accessor interface module 202 parses and/or interprets the data to obtain control information indicating the destination object, and so forth. The database 204 receives a request from the accessor interface module 202 to verify the validity of the originating object. For instance, the database determines whether the originating object has been previously registered within the vehicle communication network 126. The database 204 can cross-reference the request with objects that have been previously deemed to be verified, or declared as valid, within the vehicle communication network 126.

The accessor interface module 202 can also communicate with the database 204 upon an update to an object communication protocol. For instance, in the event the accessor interface module 202 does not recognize an object-specific communication protocol, the accessor interface module 202 communicates with the database 204 to identify the object-specific communication protocol. The accessor interface module 202 may include control information obtained from the data encoded in the object-specific communication protocol. The database 204, in return, can provide the information relating to the communication protocol to allow the accessor interface module 202 to parse and/or interpret the data. Additionally, as described herein, the database 204 can retain object-specific communications protocol. For instance, the object-specific protocol encoder module 208 can, upon receiving data encoded in the automotive connectivity communication protocol, encode at least the payload portion of the data according to the object-specific communication protocol.

In one or more implementations, when an object interfaces with the vehicle communication network 126, the database 204 receives information to register the object within the vehicle communication environment allowing future validation of the particular object. For instance, the information can include credentials and/or authentication protocols that the database 204 can retain for future validation of the particular object (i.e., device). Additionally, upon updates to the functionality of the object and/or the object-specific communication protocol, the database 204 can retain these updates for future usage.

Upon determining that the originating object has been registered, the automotive connectivity protocol encoder module 206 receives the data encoded in the device-specific communication protocol from the accessor interface module 202. The automotive connectivity protocol encoder module 206 determines the destination device based upon control information defining the destination of the data received from the accessor interface module 202.

Figure 3:
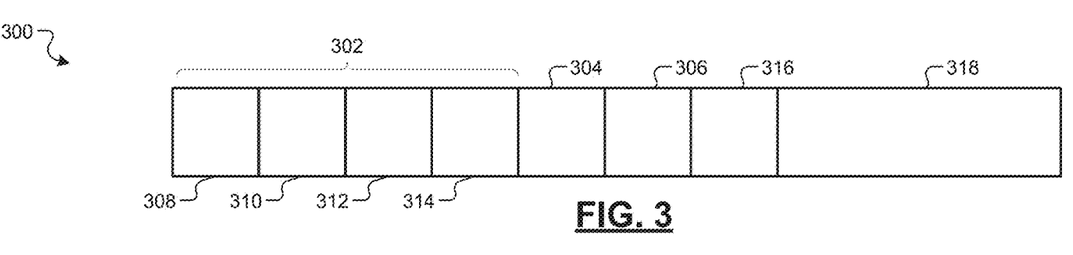
FIG. 3 illustrates a graphical representation of a data packet encoded according to an automotive connectivity communication protocol in accordance with an example implementation of the present disclosure.

The automotive connectivity protocol encoder module 206 then encodes the data in an automotive connectivity protocol such that the data can be transmitted between respective assessor modules 200 according to a homogeneous communication protocol. As shown in FIG. 3, the data, such as a data packet 300, encoded in the automotive connectivity communication protocol includes an object data portion 302, a services data portion 304, and a properties data portion 306. The object data portion 302 is used by a receiving accessor module to route the data encoded in the first communication protocol to the proper destination. For instance, the object data portion 302 indicates the transmitting device (i.e., a smartphone, a display device, a camera, a sensor, an actuator, etc.) to be connected with the vehicle 102. In one or more implementations, the object data portion 302 further includes a domain data portion 308, an object name data portion 310, a version data portion 312, and a status data portion 314.

The domain data portion 308 includes information relating to the automotive domain in which the transmitting device (i.e., component, object, etc.) is to interact through the data. For instance, the automotive domain can refer to infotainment and telematics, body electronics, power train and engine management, instrument cluster, hybrid electric vehicle, electric vehicle, and the like. The domain data portion 308 includes a respective security policy, which is retained in the database 204. The security policy is associated with the respective domain for which the object is interfacing.

For instance, the infotainment and telematics domain may be associated with a first security policy, and the power train and engine management domain may be associated with a second security policy. In this instance, the second security policy represents a higher security policy relative to the first security policy. In one or more implementations, domains associated with vehicle control utilize a security policy having higher complexity relative to domains associated with infotainment, which may utilize a security policy having a relative lower complexity.

Upon receiving the data encoded in the automotive connectivity communication protocol, the accessor interface module 202 determines whether the data is authentic. For instance, the accessor interface module 202 can determine the domain (i.e., automotive domain) associated with received data through the domain data portion 308. Utilizing the domain data portion, the accessor interface module 202 accesses the database 204 to determine whether domain data portion 308 is accessible according to the respective security policy. In some instances, the accessor interface module 202 employs an authentication protocol based upon the domain data portion 308 (i.e., based upon the security policy corresponding to the domain) to authenticate the data and/or the originating object.

The object name data portion 310 includes information representing a name of the transmitting device. In one or more implementations, the respective accessor module 200 may generate a unique identification for each respective object communicating within the vehicle communication network. The version data portion 312 includes information identifying a version and/or format associated with the object interface. The status data portion 314 includes information identifying an object status within the vehicle 102. For instance, the status data portion 314 can indicate that the originating object is "not connected," "under discovery," "connected," "error," or the like.

The services data portion 304 represents information that is exchanged between the respective objects within the vehicle communication network 126. For instance, the services data portion 304 is used to execute actions. In one example, the services data portion 304 can be utilized to perform a read operation. In another example, the services data portion 304 can be utilized to perform a write operation. In yet another example, the services data portion 304 can be utilized to perform a streaming operation. In yet another example, the services data portion 304 can be utilized to perform a callback operation. In one or more implementations, the read operation is defined as a single operation (i.e., a single read operation), and the streaming operation is defined as multiple read operations (i.e., a constant read operation). The services data portion 304 can represent, in some instances, the payload portion of the data packet 300. For instance, a destination object utilizes the information encoded in the services data portion 304 to execute an action (i.e., provide services) in accordance with the information.

The properties data portion 306 defines information about the respective object defined in the object data portion 302. In one or more implementations, the properties data portion 306 may include multiple properties associated with a respective object. Objects within the vehicle communication network 126, in some instances, access the properties of the other objects. The data packet 300 can also include a control information data portion 316 and a payload data portion 318.

With reference again to FIG. 2, the object-specific protocol encoder module 208 encodes data into an object-specific communication protocol. The object-specific protocol encoder module 208 receives data encoded in the automotive connectivity communication protocol from the accessor interface module 202. The object-specific protocol encoder module 208 decodes the data to obtain the control information data portion 316 and the payload data portion 318. The object-specific protocol encoder module 208 utilizes the control information encoded in the control information data portion 316 to obtain the communication protocol utilized to communicate with the destination object. For instance, the object-specific protocol encoder module 208 determines the destination object and utilizes a look-up table retained within the database 204 to access the communication protocol corresponding to the destination object.

Utilizing the communication protocol corresponding to the destination object, the object-specific protocol encoder module 208 encodes the control information data portion 316 and/or the payload data portion 318 according to the determined communication protocol. In some instances, the object-specific protocol encoder module 208 also encodes the object data portion 302, the services data portion 304, and the properties data portion 306 according to the determined communication protocol. The encoded data is then provided to a destination object, which may be defined within the control information data portion.

As shown in FIG. 2, the data transmission module 210 transmits the data received from the automotive connectivity protocol encoder module 206 to the destination accessor module 200 via the vehicle communication network 126. The data transmission module 210 also transmits data received from the automotive connectivity communication protocol decoder object-specific protocol encoder module 208 to the destination object via the vehicle communication network 126, as described herein.

Figure 4:
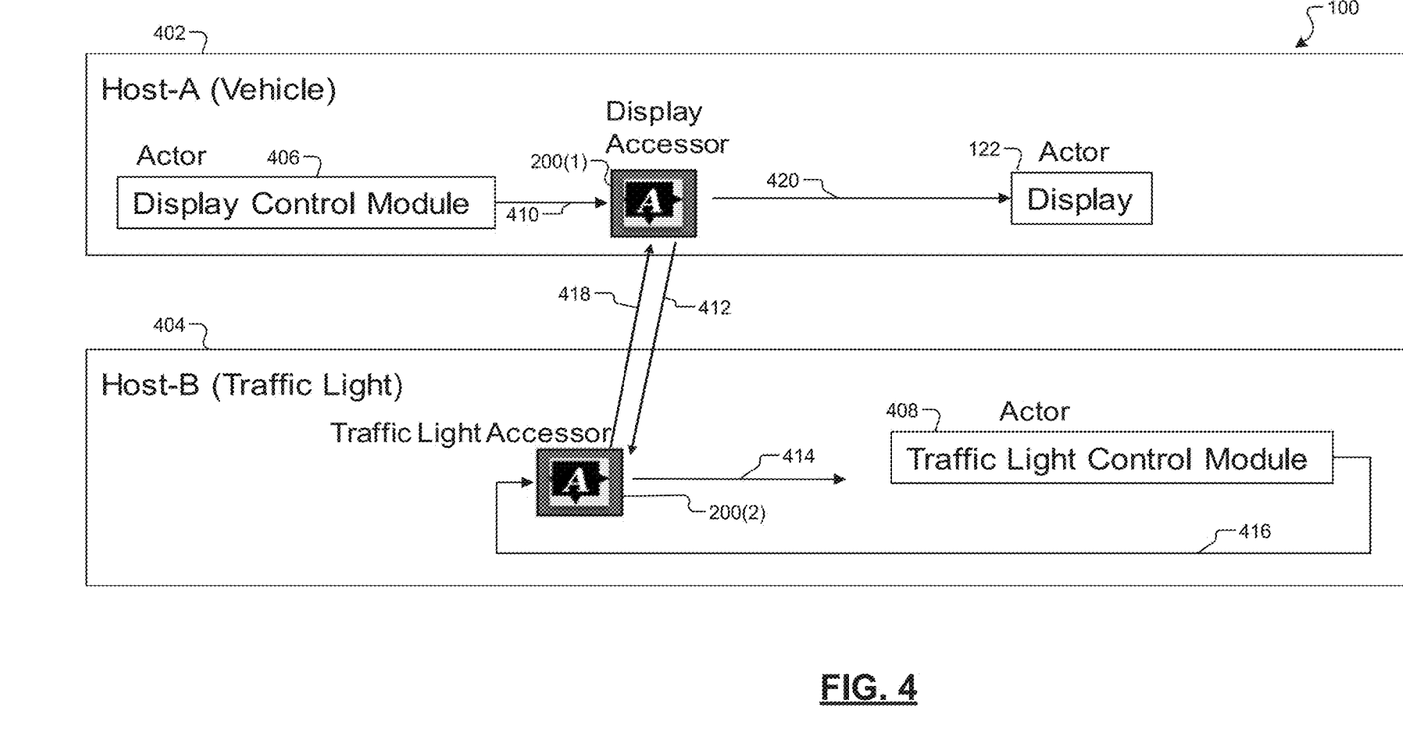
FIG. 4 illustrates a graphical representation of a first object (i.e., device) communicating with a second object (i.e., device) via a vehicle communication network in accordance with an example implementation of the present disclosure.

FIG. 4 illustrates an example implementation of the example vehicle communication environment 100 illustrating communication between various objects within a vehicle communication network 126. As shown, the example vehicle communication environment 100 includes two devices 402, 404 (i.e., objects 402, 404). Each device 402, 404 also includes a respective accessor module 200(1), 200(2). The first device 402 (i.e., first object 402) is a vehicle, such as vehicle 102. The first device 402 also includes a display control module 406 that controls the functionality of the display 122. The respective devices 402, 404 (i.e., objects) also represent a respective host device that offers information resources, services, and/or applications to other nodes within the vehicle communication network 126.

In this example, the second device 404 (i.e., second object 404) is a traffic light. The second device 404 includes a traffic light control module 408 that receives traffic light timing request signals from various vehicles through the vehicle communication network 126. In response to the traffic light timing signals, the traffic light control module 408 transmits traffic light timing signals indicating a time associated with a particular traffic light. For instance, the traffic light timing signal may represent a time period until a first light (i.e., a green light) transitions to a second light (i.e., a yellow light or a red light), and vice versa. As shown in FIG. 4, the display control module 406, the display 122, and the traffic light control module 408 represent an actor within the context of the vehicle communication environment 100. Thus, the respective accessor modules 200 function as a wrapper for the respective services and/or applications to encapsulate the functionality provided by the respective host device.

According to an example implementation, the display control module 406 generates a request signal 410 encoded in a first communication protocol (i.e., a display control module communication protocol). The accessor module 200(1) receives the request signal 410 from the display control module 406. The accessor interface module 202 of the accessor module 200(1) utilizes the database 204 to verify the validity of the display control module 406. The automotive connectivity protocol encoder module 206 of the accessor module 200(1) then encodes the data representing the request according to the automotive connectivity communication protocol, which is referred to as an encoded request signal 412, and the data transmission module 210 transmits the encoded request signal 412 over the vehicle communication network 126.

The encoded request signal 412 represents a data packet, such as data packet 300, that includes the object data portion 302, the services data portion 304, and the properties data portion 306. In this example, the domain data portion 308 indicates that the originating object 402 (i.e., object transmitting the data) is within the telematics domain. Additionally, the object name data portion 310 may identify the object 402 as a display control module, and the version data portion 312 identifies a version associated with the display control module. Finally, the status data portion 314 indicates a status of the display control module (i.e., not connected, under discovery, connected, error, etc.). The encoded request signal 412 also includes a respective services data portion 304 indicative of the services associated with the encoded request signal 412 and also includes a respective properties data portion 306 indicative of the properties of the first object 402.

The encoded request signal 412 is transmitted over the vehicle communication network 126 to the accessor module 200(2). The accessor interface module 202 of the accessor module 200(2) receives the encoded request signal 412. The accessor interface module 202 parses and/or interprets the encoded request signal 412. In an implementation, the accessor interface module 202 validates that the first object 402 can communicate with the second object 404. In one example, the database 204 can validate based upon the security policy associated with the first object 402. For instance, the database 204 of the accessor module 200(2) cross-references the security policy of the first object 402 with the security policy of the second object 404 retained in the database 204. In another example, the database 204 verifies that the version of the first object 402 is supported by the second object 404.

Once validated (i.e., verified), the encoded request signal 412 is provided to the object-specific protocol encoder module 208 to decode the encoded request signal 412. For instance, the object-specific protocol encoder module 208 can decode (i.e., de-capsulate) the automotive connectivity communication protocol from the encoded request signal 412 to generate a request signal 414. In some implementations, the object-specific protocol encoder module 208 encodes the request signal 414 according to a second communication protocol (i.e., an object-specific communication protocol) based upon the communication protocol utilized to communicate with the traffic light control module 408. Thus, the object-specific protocol encoder module 208 encodes the request signal 414 according to a traffic light control module communication protocol. The request signal 414 is provided to the data transmission module 210, which transmits the request signal 414 to the traffic light control module 408.

The traffic light control module 408 receives the request signal 414 and generates a traffic light signal 416 providing the requested information. The traffic light signal 416 is provided to the accessor module 200(2). The accessor module 200(2) encodes the traffic light signal 416 according to the automotive connectivity communication protocol and generates an encoded traffic light signal 418 to the accessor module 200(1). The accessor module 200(1) decodes the encoded traffic light signal 418 to generate a traffic light signal 420. Similar to the request signal 414, the object-specific protocol encoder module 208 of the accessor module 200(1) encodes the traffic light signal 420 according to a third communication protocol. For instance, the third communication protocol corresponds to a display communication protocol. Once encoded according to the third communication protocol, the traffic light signal 420 is provided to the display 122. The display 122 can utilize the traffic light signal 420 to display information relating to the traffic light 404.

Figure 5:
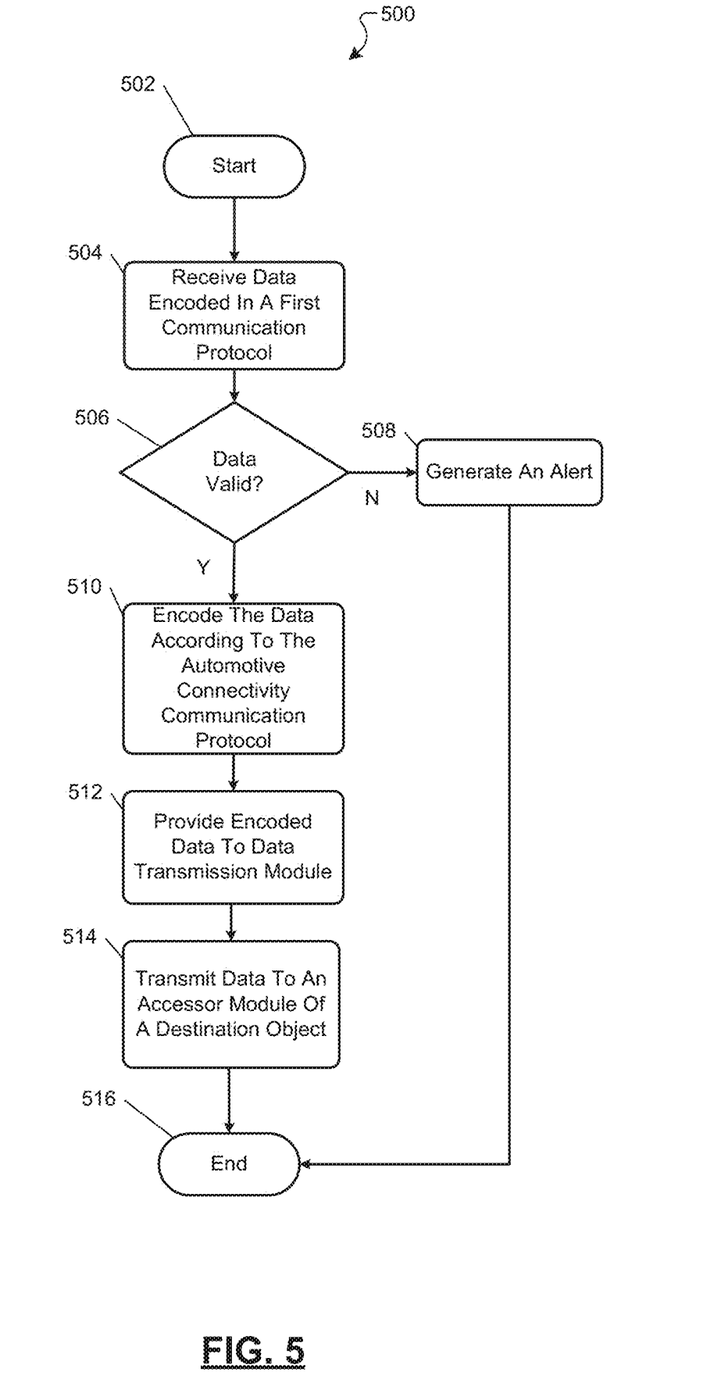
FIG. 5 is a flow diagram illustrating an example method for transmitting data in accordance with the present disclosure.

FIG. 5 illustrates an example method 500 for receiving data encoded in a first communication protocol from a first device (i.e., first object) within a vehicle communication network 126 and encoding the data according to the automotive connectivity communication protocol. The method 500 begins at 502. At 504, an accessor interface module 202 of an accessor module 200 receives data encoded in a first communication protocol. At 506, the accessor interface module 202 determines whether the object that transmitted the data encoded in the first communication protocol is valid. For instance, the accessor interface module 202 can compare the version associated with the data to a version (i.e., a version threshold indicating compatible versions, etc.) retained in the database 204 to ensure that the example vehicle communication environment 100 supports the version. In another instance, the accessor interface module 202 can determine whether the originating device and/or the transmitted data is authenticated. If the originating object is not valid, the accessor interface module 202 generates an alert that indicates the object is not valid at 508. The accessor interface module 202 can transmit the alert to an electronic device 124 associated with the user or cause the display 122 to display the alert.

At 510, the data is encoded in the automotive connectivity communication protocol by the automotive connectivity protocol encoder module 206. For instance, the automotive connectivity protocol encoder module 206 encapsulates the data into a data packet according to the automotive connectivity communication protocol. At 512, the data encoded in the automotive connectivity communication protocol is provided to the data transmission module 210. At 514, the data transmission module 210 transmits the data encoded in the automotive connectivity communication protocol to an accessor module 200 of the destination object via the vehicle communication network 126. The data transmission module 210 determines the destination object utilizing the control information encoded in the data packet. The method 500 ends at 516.

Figure 6:
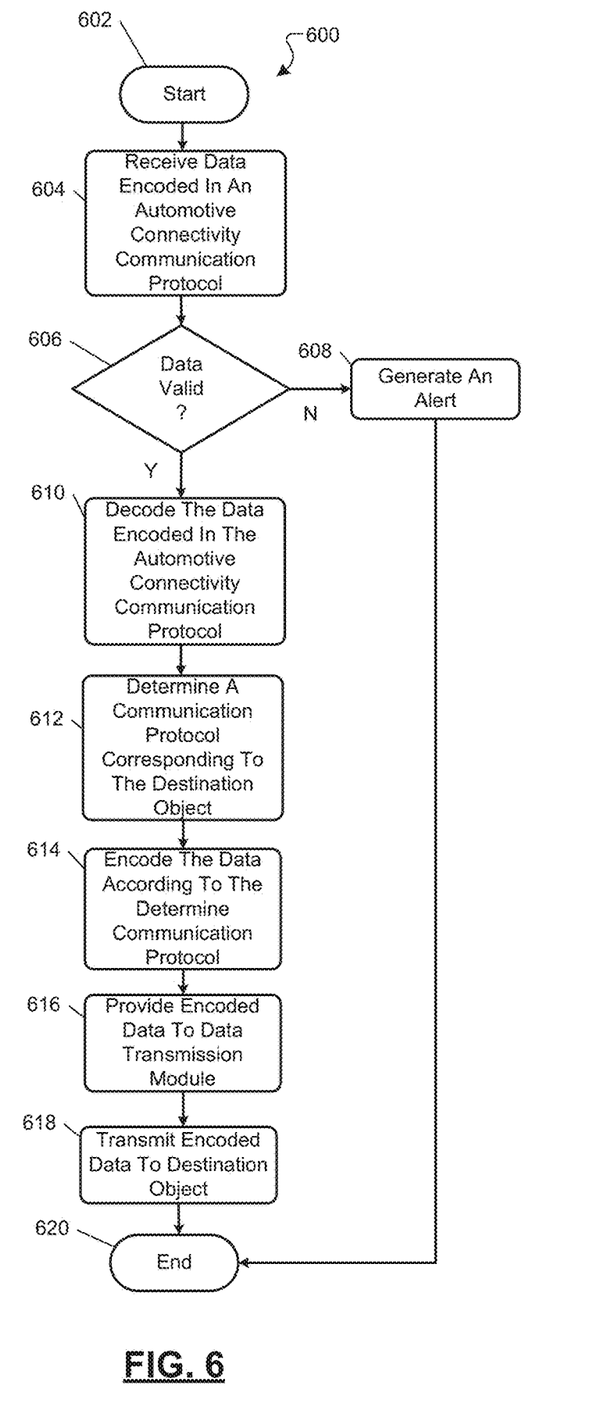
FIG. 6 is a flow diagram illustrating another example method for transmitting data in accordance with the present disclosure.

FIG. 6 illustrates an example method 600 for receiving data (i.e., a data packet) encoded in the automotive connectivity communication protocol. The method 600 begins at 602. At 604, data encoded in the automotive connectivity communication protocol is received at an accessor interface module 202 of an accessor module 200 of a destination object. At 606, the accessor interface module 202 determines whether the data is valid. In one example, the accessor interface module 202 compares the version encoded in the version data portion 312 to the supported version(s) retained in the database 204. In another example, the accessor interface module 202 compares the domain encoded in the domain data portion 308 with the domain of the receiving object. Additionally, the accessor interface module 202 determines whether the data encoded in the automotive connectivity communication protocol is authentic via suitable security protocols employed by the accessor module 200. For instance, the accessor interface module 202 can employ suitable authentication procedures to authenticate the data encoded in the automotive connectivity communication protocol.

At 608, the accessor module 200 of the destination object (i.e., object that receives the data indicative of the rejection) can generate an alert indicative of the insufficient authentication to the user (i.e., at an electronic device 124, at a display 122, etc.). Additionally, the accessor interface module 202 provides data indicating the received data has been rejected due to insufficient authentication.

At 610, the object-specific protocol encoder module 208 decodes the data encoded in the automotive connectivity communication protocol. For instance, the object-specific protocol encoder module 208 decodes (de-capsulates) the data to obtain the control information portion and the payload portion of the data packet. For instance, the object-specific protocol encoded module 208 obtains the information within the services data portion 304. At 612, the object-specific protocol encoder module 208 determines a second communication protocol for the destination object. The object-specific protocol encoder module 208 determines a second communication protocol for the destination object utilizing the control information encoded in the data. The object-specific protocol encoder module 208 can utilize a look-up table in the database 204 to determine the second communication protocol for the destination object. At 614, the object-specific protocol encoder module 208 encodes the data (i.e., the control information and the payload information) in the second communication protocol. At 616, the encoded data is provided to the data transmission module 210. At 618, the data transmission module 210 transmits the data encoded in the second communication protocol to the destination object. The method 600 ends at 620.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A vehicle communication system, comprising:
a first control module in communication with a destination device within a vehicle communication network and having a first processor configured to: (i) receive data encoded in an automotive connectivity communication protocol from a second control module in communication with an originating device within the vehicle communication network and having a second processor, the data encoded in the automotive connectivity communication protocol including a domain data portion and a payload data portion, the domain data portion indicating an originating automotive domain of the originating device; (ii) decode the data encoded in the automotive connectivity communication protocol to obtain the domain data portion and the payload data portion; (iii) determine a security policy associated with the originating automotive domain indicated by the domain data portion; (iv) authenticate the data based on a comparison of the originating automotive domain indicated by the domain data portion and a destination automotive domain of the destination device and based on the determined security policy associated with the originating automotive domain indicated by the domain data portion; (v) determine an object-specific communication protocol associated with the destination device; (vi) encode the payload data portion according to the object-specific communication protocol; and (vii) transmit the payload data portion encoded according to the object-specific communication protocol to the destination device;
wherein the originating automotive domain and the destination automotive domain are each one of: an infotainment and telematics domain, a body electronics domain, a power train and engine management domain, an instrument cluster domain, a hybrid electric vehicle domain, and an electric vehicle domain.

2. The vehicle communication system of claim 1 further comprising a database that is configured to retain the object-specific communication protocol.

3. The vehicle communication system of claim 1 wherein the data includes an object name portion indicative of a name of the originating device and a version data portion indicative of a version associated with the originating device.

4. The vehicle communication system of claim 3 wherein the first control module is further configured to compare the version associated with the originating device with a version threshold to determine whether the version associated with the originating device is compatible with a version of the destination device.

5. The vehicle communication system of claim 1, wherein the destination device comprises at least one of an electronic device, a sensor, an actuator module, and a display.

6. The vehicle communication system as recited in claim 1 wherein the domain data portion includes a security parameter corresponding to the domain data portion.

7. A method, comprising:
receiving, with a first control module in communication with a destination device within a vehicle communication network and having a first processor, data encoded in an automotive connectivity communication protocol from a second control module in communication with an originating device within the vehicle communication network and having a second processor, the data encoded in the automotive connectivity communication protocol including a domain data portion and a payload data portion, the domain data portion indicating an originating automotive domain of the originating device;
decoding, with the first control module, the data encoded in the automotive connectivity communication protocol to obtain the domain data portion and the payload data portion;
determining, with the first control module, a security policy associated with the originating automotive domain indicated by the domain data portion;
authenticating, with the first control module, the data based on comparing the originating automotive domain indicated by the domain data portion and a destination automotive domain of the destination device and based on the determined security policy associated with the originating automotive domain indicated by the domain data portion;
determining, with the first control module, an object-specific communication protocol associated with the destination device;
encoding, with the first control module, the payload data portion according to the object-specific communication protocol; and
transmitting, with the first control module, the payload data portion encoded according to the object-specific communication protocol to the destination device;
wherein the originating automotive domain and the destination automotive domain are each one of: an infotainment and telematics domain, a body electronics domain, a power train and engine management domain, an instrument cluster domain, a hybrid electric vehicle domain, and an electric vehicle domain.

8. The method of claim 7 wherein the data includes an object name portion indicative of a name of the originating device and a version data portion indicative of a version associated with the originating device.

9. The method of claim 8 further comprising: comparing, with the first control module, the version associated with the originating device with a version threshold to determine whether the version associated with the originating device is compatible with a version of the destination device.

10. The method of claim 7, wherein the destination device comprises at least one of an electronic device, a sensor, an actuator module, and a display.

11. The method as recited in claim 7 wherein the domain data portion includes a security parameter corresponding to the domain data portion.

12. A vehicle communication system, comprising:
a destination device communicatively coupled to a vehicle communication network and in communication with a first control module having a first processor;
an originating device communicatively coupled to the vehicle communication network and in communication with a second control module having a second processor, the second control module being configured to:
receive data encoded in a first communication protocol associated with the originating device; and
encode the data according to an automotive connectivity communication protocol, the data encoded in the automotive connectivity communication protocol including a domain data portion and a payload data portion, the domain data portion indicating an originating automotive domain of the originating device and having a corresponding authentication protocol; and
the first control module being configured to:
receive the data encoded in the automotive connectivity communication protocol from the second control module, decode the data encoded in the automotive connectivity communication protocol to obtain the domain data portion and the payload data portion;
determine a security policy associated with the originating automotive domain indicated by the domain data portion;
authenticate the data based on a comparison of the originating automotive domain indicated by the domain data portion and a destination automotive domain of the destination device and based on the determined security policy associated with the originating automotive domain indicated by the domain data portion;
determine an object-specific communication protocol associated with the destination device;
encode the payload data portion according to the object-specific communication protocol; and
transmit the payload data portion encoded according to the object-specific communication protocol to the destination device;
wherein the originating automotive domain and the destination automotive domain are each one of: an infotainment and telematics domain, a body electronics domain, a power train and engine management domain, an instrument cluster domain, a hybrid electric vehicle domain, and an electric vehicle domain.

13. The vehicle communication system of claim 12 wherein the destination device further comprises a database that is configured to retain the object-specific communication protocol.

14. The vehicle communication system as recited in claim 12 wherein the domain data portion includes a security parameter corresponding to the domain data portion.

* * * * *